(12) United States Patent
Later

(10) Patent No.: US 6,644,043 B2
(45) Date of Patent: *Nov. 11, 2003

(54) METHOD AND APPARATUS OF HEAT-SHOCKING FRESH PRODUCE AND FOR COOLING SUCH PRODUCE TO A DESIRED TEMPERATURE AND MOISTURE CONTENT

(75) Inventor: Roger Carson Later, 1427 Euclid St., Santa Monica, CA (US) 90404

(73) Assignee: Roger Carson Later, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/210,990

(22) Filed: Aug. 2, 2002

(65) Prior Publication Data

US 2002/0184897 A1 Dec. 12, 2002

Related U.S. Application Data

(63) Continuation of application No. 09/804,201, filed on Mar. 13, 2001, now Pat. No. 6,434,951, which is a continuation-in-part of application No. 09/431,363, filed on Nov. 1, 1999, now abandoned, which is a continuation-in-part of application No. 09/040,139, filed on Mar. 17, 1998, now Pat. No. 5,992,169.

(51) Int. Cl.[7] ............................................... F25B 19/00
(52) U.S. Cl. ............................... 62/64; 62/270; 62/264; 62/100; 99/100
(58) Field of Search ............................. 62/64, 62, 374, 62/100, 270, 268, 264, 376; 99/470

(56) References Cited

U.S. PATENT DOCUMENTS

| | | | | | |
|---|---|---|---|---|---|
| 3,844,132 | A | * | 10/1974 | Miller et al. | ................... 62/100 |
| 4,576,014 | A | * | 3/1986 | Miller et al. | ................... 62/268 |
| 5,277,031 | A | * | 1/1994 | Miller et al. | ................... 62/100 |
| 5,375,431 | A | * | 12/1994 | Later et al. | ................... 62/268 |
| 5,386,703 | A | * | 2/1995 | Later | ........................... 62/264 |
| 5,992,169 | A | * | 11/1999 | Later | ........................... 62/100 |
| 6,434,951 | B2 | * | 8/2002 | Later | ........................... 62/374 |

* cited by examiner

Primary Examiner—William C. Doerrler
(74) Attorney, Agent, or Firm—Kleinberg & Lerner LLP

(57) ABSTRACT

Produce, especially processed produce, such as lettuce, broccoli and potatoes, is heat-shocked with water having an elevated temperature relative to the produce, to minimize discoloration of the produce from the processing after the heat shock, the produce is low pressure or vacuum cooled and dried to remove heat-shock water adsorbed and absorbed by the produce.

15 Claims, 4 Drawing Sheets

Heat Balance Calculations for Water Removal by Vacuum Cooling

Necessary Incoming Produce Temperature °F for Complete Evaporation

| Spray/Immersion Water Temperature °F | Water Adsorbtion Percentage | | |
|---|---|---|---|
| | 5% | 10% | 15% |
| 35 °F | 79.5°F | 128°F | 176.5°F |
| 40 °F | 74.5°F | 123°F | 171.5°F |
| 50 °F | 64.5°F | 113°F | 161.5°F |
| 60 °F | 54.5°F | 103°F | 151.5°F |
| 70 °F | 44.5°F | 93°F | 141.5°F |
| 80 °F | 34.5°F | 83°F | 131.5°F |
| 90 °F | 24.5°F | 73°F | 121.5°F |
| 100 °F | 14.5°F | 63°F | 111.5°F |
| 110 °F | 4.5°F | 53°F | 101.5°F |
| 120 °F | -5.5°F | 43°F | 91.5°F |

FIG. 2A

Heat Balance Calculations for Water Removal by Vacuum Cooling

100 °F Spray/Immersion Water Temperature

| Water Adsorption Percentage: | 5% | 10% | 15% |
|---|---|---|---|
| Spray/Immersion Water Temperature °F | 100 | 100 | 100 |
| Desired Produce Temperature °F | 33 | 33 | 33 |
| Difference in Temperature °F | 67 | 67 | 67 |
| Multiplied by 1 SpHt | 67 | 67 | 67 |
| then, multiplied by 100 lbs produce  Equals, BTu's to be removed | 6700 | 6700 | 6700 |
| Divide by;  BTu's/lbs water evaporated | 970 | 970 | 970 |
| Equals, Lbs of H2O to cool H2O | 6.91 | 6.91 | 6.91 |
| Moisture adsorption in lbs. | 5 | 10 | 15 |
| Less lbs. of H2O to cool H2O | 6.91 | 6.91 | 6.91 |
| Equals H2O to cool produce | -1.91 | 3.09 | 8.09 |
| Times BTu's/lbs water evaporated | 970 | 970 | 970 |
| Equals, BTu's/100 lbs. produce  Divide by; | -1850 | 3000 | 7850 |
| 100 lbs. of produce | -18.5 | 30 | 78.5 |
| Times 1 SpHt, equals ° F Heat Evaporated | -18.5 | 30 | 78.5 |
| Plus; Desired Produce Temperature °F | 33 | 33 | 33 |
| Equals;  Necessary Incoming Produce Temperature °F for Complete Evaporation | 14.50 | 63.00 | 111.50 |

FIG. 2B

METHOD AND APPARATUS OF HEAT-SHOCKING FRESH PRODUCE AND FOR COOLING SUCH PRODUCE TO A DESIRED TEMPERATURE AND MOISTURE CONTENT

RELATED APPLICATIONS

This application is a continuation of application Ser. No. 09/804,201, filed Mar. 13, 2001 now U.S. Pat No. 6,434,951, which is a continuation-in-part of application Ser. No. 09/431,363, filed Nov. 1, 1999 now abandoned, which is a continuation-in-part of Ser. No. 09/040,139, filed Mar. 17, 1998, now U.S. Pat. No. 5,992,169.

BACKGROUND OF THE INVENTION

Field of the Invention

This invention provides methods and apparatuses for applying controlled elevated temperature water to fresh produce such as lettuce, broccoli and potatoes to create a heat-shock response in the produce tissue, and then removing the water and cooling the produce by vacuum evaporation of the water, leaving the produce tissue at a desired temperature and with a desired moisture content.

U.S. Pat. No. 5,992,169, incorporated herein by reference as though fully set forth here, discloses vacuum cooling and drying of fresh produce such as lettuce, and apparatus therefor, as an alternative and superior method to centrifuge drying and cooling, or forced air drying and cooling of processed produce. Pertinent parts of the specification are included in this application. Vacuum cooling, and drying requires less handling, and, therefore, causes less abrasion and abuse of produce tissue, reducing wound response and browning of the tissue, and enhancing marketability.

Produce sprayed or immersed in water absorbs and adsorbs water. For example, iceberg lettuce immersed in water after being chopped or cut may take up to twenty percent or more of its weight in water. The more water that the lettuce tissue absorbs/adsorbs, the higher the temperature must be to evaporate unwanted water in a given time period, in the vacuum evaporation process. (See FIGS. 2A and 2B).

To minimize lettuce residency time in rinse water without sacrificing produce quality, research has been done to determine what the upper temperature limit of lettuce rinse water could be. Surprisingly, lettuce tissue can withstand rather high air and water temperatures. Warm air or water applied to produce tissues causes a preservation response called a heat-shock response. See Loaiza-Velarde, J. G., Thomas-Barbera, F. A., and Saltvelt, M. E., "Effect of Intensity and Duration of Heat-shock Treatments on Wound-induced Phenolic Metabolism in Iceberg Lettuce," J. Amer. Soc. Hort. Sci. 122(6):873–877 (1997), incorporated by reference as though fully set forth herein. This response causes physiological changes in produce tissue which, when growing, aids in survival, and, after harvest, preserves marketability. This response causes enzyme changes in lettuce, especially processed lettuce, which can delay or prevent discoloration, e.g. browning, increasing lettuce marketability. (By "processed lettuce" is meant lettuce that has been cut, chopped, shredded and/or cored.) In accordance with the present invention, this ability of produce to withstand elevated water temperatures and, in fact, to benefit from this immersion, also provides a synergistic relationship with the vacuum cooling and drying of fresh produce, in that the rinse water removal by vacuum drying, i.e. evaporation, is made more effective or efficient by the elevated starting temperature of the water. In its optimum aspects, the present invention utilizes the synergistic combination of heat shock and vacuum drying and cooling. Nevertheless, the Invention contemplates the same synergism by using an elevated temperature rinse water, which may be above the starting temperature of the produce, even though that elevated temperature is less than that which will produce heat shock.

At present, the packaged salad industry utilizes proper cooling, special semipermeable membrane bags, and/or modified gas atmospheres to control the metabolism of plant tissue and to minimize browning of produce, especially processed lettuce. Immersion of such produce in water at a temperature in the range of 50° F. to 160° F. for a suitable time to produce the heat-shock response, itself inhibits browning.

For additional information, see the following publications:

1. Brecht, J. K., 1995, "Physiology of Lightly Processed Fruits and Vegetables," Hort Science 30: 18–22.
2. Bolin, H. R. and Hursoll, C. C., 1991. "Effect of Preparation Procedure and Storage Parameters on Quality Retention of Salad-Cut Lettuce," J. Food Sci., 56: 60–67.
3. Couture, R., Cantwell, M. I., Ke, D, and Saltviet, N. E., 1993. "Physiological Attributes and Storage Lite of Minimally Processed Lettuce," Hort. Science 28: 223–725.
4. Ke, D. and Saltviet, N. E., 1988, "Plant Hormone Interaction and Phenolic Metabolism in the Regulation of Russet Spotting in Iceberg Lettuce," Plant Physical; 88; 1136–1140.
5. Loaize-Velarde, J., Tomas-Barberan, F. A., Saltviet, N. E., 1997. "Effect of Intensity and Duration of Heat Shock Treatments on Wound Induced Phenolic Metabolic in Iceberg Lettuce," J. Amer Soc. Hort. Science 122(6): 873–877.
6. Lopez Galvez, G. Saltviet, M. E., and Cantwell, M., 1997. "Wound Induced Phenylalanine Ammonia Lyase Activity: Factors Affecting its Induction and Correlation with the Quality of Minimally Processed Lettuce," Postharvest Biol. Technol. 9: 223–233.
7. Pollock, C. F., Eagles, C. F., Howarth, C. J., Schunumann, P. H. D., and Stoudart, J. L., 1993. "Temperature Stress"0 p. 109–132 In: L. Fowden, T. Mansfield, J. Stoudart (Eds) *Plant Adaptation to Environmental Stress*. Chapman and Hall, New York.
8. Saltviet, M. E., 1997. "Physical and Physiological Changes in Minimally Processed Fruits and Vegetables," p. 205–220 In: F. A. Tomes Barberan (Ed.) *Phytochemistry of Fruits and Vegetables*. Oxford University Press, Oxford, UK.
9. Vierling, E., 1991, "The Roles of Heat Shock Proteins in Plants." Annu. Rev. Plant Physiol. Plant. Mol. Biol. 42:579–620.

Summary of the Invention

This invention provides methods for delivering produce, especially processed produce such as lettuce, broccoli and potatoes at a desired temperature and a desired moisture content, after the produce has been subjected to a heat shock or other anti-browning treatment. The process of heat-shocking produce, then cooling and drying it, can be applied to any produce In need of cooling and drying for shipment or storage, but is especially effective on lettuce, such as iceberg lettuce.

For most processed produce, and particularly for green leafy produce such as lettuce, where the harvest temperature of the produce is in the range of about 35° F. to about 90° F., the heat-shock reaction takes place and can be detected when the processed produce is exposed to a temperature about 18° F. higher than the harvest temperature of the produce. However, It Is Important not to heat the produce too much. Proper heat shock treatment therefore depends on the temperature of the produce at the outset of the heat-shock process, the temperature of the water utilized to cause the shock, and the time needed to create the heat-shock response, i.e. BTU's delivered. Preferably, but not necessarily, the produce has a temperature of about 50° F. at the beginning of the heat-shock process, but could have a temperature as low as about 33° F. The exposure to higher temperature water, e.g. water at a temperature of about 50° F. to about 160° F., continues until the heat-shock response has taken place, e.g., for about 30 to 480 seconds. Thereafter, the temperature of the produce is reduced to the range between about 34° F. and about 41° F., i.e. to a temperature where the metabolism of the produce Is slowed substantially without killing the produce.

The processing (cutting, chopping, shredding, and/or coring) of lettuce induces alterations in the phenolic metabolism of the lettuce which causes browning, reducing quality. Phenylalanine ammonia-lyase (PAL) and the concentration of phenolic compounds (e.g. chlorogenic acid, dicaffeoyl tartaric acid and iso-chlorogenic acid) increase in wound areas after processing. This increase in the wound response enzyme activity is reduced when the cut tissue is exposed to a heat-shock environment which redirects the protein synthesis away from a cut-shock response.

The reduction of PAL activity Increases with the duration of heat-shock treatment, and the reduction of PAL Increases faster as the water temperature increases. PAL activity is barely detected after a 60-second treatment with 155° F. water. However, heat-shock treatment at a water temperature above 140° F. and up to about 155° F. for 30 seconds may damage produce tissue. For example, lettuce tissue becomes translucent. Therefore, it is important that the starting temperature of the produce to be heat-shocked be known and be low enough to prevent over-heating, but not so low as to create undue expense. For the proper conditions of temperature and time, see, generally, the above-cited article by Loaiza-Velarde et al.

Heat-shock protein synthesis redirection differs depending on the nature of the produce. Produce with preformed phenolic compounds, such as artichokes and avocados, will brown after wounding even if subjected to elevated temperatures. However, iceberg, red and green leaf, romaine and butter lettuce, as well as broccoli, all can have their enzyme activity redirected by exposure to hot water. The exposure to heat shock water significantly reduces the PAL activity and associated phenolic activity.

Alternatively or additionally, the water rinse/vacuum cooling process can be utilized to apply antibrowning agents to produce tissue with elevated levels of preformed phenolics like potatoes and apples, and then to cool the produce. These anti-browning agents can be applied evenly in the produce rinse water, which can then be rinsed off before the evaporation process.

Many different methods are available to cool heat-shocked processed produce. For example, forced air cooling is available, but the forced air dries the produce tissue unevenly, resulting in a product that is unappealing to consumers. Centrifuge drying of lettuce is available, but It cannot remove water in precise amounts, and tends to crush the lettuce tissue, resulting in limp leaves, reducing yield, and leaving lettuce that is unappealing. On the other hand, vacuum pressure evenly removes a desired and controlled amount of water and a desired amount of heat, resulting in more appealing lettuce. In addition, vacuum cooling provides an increased yield per head, as the outermost cap leaves, which are damaged by centrifuges, can be utilized. In evaporative cooling of lettuce, evaporation of about one percent water by weight effects approximately a 10° F. temperature reduction of the produce.

It may be desired or necessary to conduct the vacuum cooling process in multiple evacuation stages, where the vacuum is released between successive evacuation stages. In that case one may direct the incoming vacuum release air to blow surface water from the produce.

As one illustrative example, consider 1,000 pounds of chopped lettuce harvested at 85° F. First, the temperature of the lettuce is reduced to 50° F. by vacuum cooling with cold water or with cold air. This cooling ensures that the exposure to a heat-shock environment will not heat the tissue to too high a temperature, causing translucence. Conversely, if the lettuce to be processed has a starting temperature from about 33° F. to about 41° F, this would be acceptable, or the starting temperature could be adjusted upwardly somewhat if desired, with warm air, warm water, or heating frequencies of light, as desired. It is not necessary, practical or economical to cool the produce too much. The selection of a base or starting temperature for heat-shock depends on the kind of produce and its specific reaction to the heat-shock environment.

Having established a base temperature, the lettuce is placed into approximately 122° F. water for 60–120 seconds to warm the tissue and cause the desired heat-shock effect. This immersion warms the lettuce to approximately 114° F. while the tissue adsorbs/absorbs about eight percent water by weight. The lettuce is then placed in a vacuum chamber, such as described in the previously mentioned U.S. Pat. No. 5,992,169. The chamber is described below. See also FIG. 3. The vacuum pump is activated and the sub-atmospheric pressure inside the chamber is reduced to about 4.7 mm of mercury. This reduction in pressure effects evaporation of the aforesaid eight percent absorbed/adsorbed water, while concomitantly reducing the temperature of the produce to the desired termperature of approximately 33° F.

As another example, consider fresh-cut red or green leaf lettuce that arrives at the processing facility with a tissue temperature of 45° F. The lettuce is treated with water at a temperature of about 70° F. until the tissue temperature reaches approximately 65° F., effecting the desired heat-shock. At this time the tissue will have absorbed/adsorbed about three percent moisture and can be transferred to the vacuum chamber for cooling and drying, as described above.

To treat and cool fresh cut potatoes, the potatoes are first immersed in water with a suitable anti-browning agent, and then transferred to vacuum cooling/rinse water with a temperature of about 155° F. The potatoes are retained in the water until the tissue temperature reaches about 155° F., to effect the desired heat-shock. This water immersion adds about twelve percent by weight of water to the cut potatoes. Thereafter, the potatoes are cooled in a vacuum chamber, as aforementioned, by reducing the pressure inside the chamber to a vacuum pressure corresponding to a desired evaporation point, preferably to a pressure of about 4.7 mm of mercury, which is the pressure that corresponds to evaporating 33° F. water. In this step, more than twelve percent by weight of water is removed from the potatoes, leaving the potato tissue slightly dry to minimize biotic growth during shipment and storage.

Water treatment of produce to attain the heat-shock reaction may cause more water to be adsorbed/absorbed than can be removed by vacuum pressure in a one-step reduction to sub-atmospheric pressure. One solution is to form a vacuum within a chamber, then release the vacuum while directing the incoming air to blow surface water from the produce tissue. This use of incoming air to blow surface water from the tissue could also be used to warm the tissue (add BTU's), thereby facilitating additional moisture to be evaporated in a subsequent vacuum evaporation/cooling cycle without risking freeze damage. This use of incoming air may be repeated through additional cycles as necessary to obtain the desired moisture content and desired temperature of the produce.

This rewarming may also serve to repeat or augment the heat shock process. For example, after a preheat-shock temperature adjustment (if needed), produce such as iceberg lettuce may be Introduced to 90° F. water for 60–120 seconds, raising its temperature to 85° F., resulting in an approximately eight percent by weight adsorption/absorption of water on and in Its tissue. The cooling and drying process may be as follows: The produce is loaded into a vacuum chamber as aforementioned and the pressure reduced to 5.17 mm of mercury (the pressure that corresponds to evaporating 35° F. water) to evaporate about 5% of the 8% of the added water. The sub-atmospheric pressure then could be released for a time with the incoming air blowing one percent of the moisture off the produce while warming the produce tissue to 55° F. At this time, the vacuum pressure Is reestablished, to bring the vacuum chamber to 4.7 mm of mercury pressure and to remove the remaining 2% of the added 8% water. Alternatively, the release of vacuum pressure might be allowed to raise the produce tissue temperature higher, allowing for a slight drying of the produce for storage and marketability reasons.

Alternatively, excess water adhering to the surface of the processed lettuce could be removed by conventional centrifuge or by air pressure outside the vacuum chamber before vacuum cooling and drying.

As another alternative, temperature adjusted lettuce is placed in a tray or basket and loaded into a vacuum chamber as aforementioned. Water in the range of about 50° F. to about 160° F. is then delivered into the chamber and onto the produce to cause the heat-shock response. The warm water is removed from the chamber and pressurized air may be used to remove excess water. The pressure inside the chamber is reduced to 4.7 mm of mercury and the produce is held at this pressure until the lettuce is cooled to 33° F. and the desired amount of water remains in the lettuce. The lettuce is then ready for packaging.

In another alternative, water vapor with a temperature between 50° F. and 212° F. is applied to produce tissue inside or outside a vacuum chamber to heat-shock the produce. This vapor condenses evenly on the produce while delivering the necessary heat-shock. This water vapor delivery prevents excessive water adsorption, and the produce then is cooled in the vacuum cooling/drying procedure, as described above.

In another alternative, broccoli may be sprayed with or immersed in 122° F., or higher, water for a time sufficient to cause the heat-shock reaction. This broccoli can then be quenched, cooled and dried by chilled water and centrifuging, or by chilled air alone. However, if the broccoli is to be vacuum cooled and dried pursuant to the procedures of the present invention, the broccoli may need to be cooled in several steps or stages. In each step or stage, cooling water Is applied to the broccoli, the broccoli is then vacuum cooled to a given temperature Water is applied again, and the broccoli is again vacuum cooled. These steps are repeated until the broccoli reaches the desired temperature.

In some circumstances it Is necessary to treat the produce with pesticides, as in the case of certain export shipments. This can be readily and effectively accomplished in conjunction with the procedure of the present invention. For example, after the heat-shock treatment, and following the vacuum cooling/drying procedure, when the vacuum is released, the gas introduced into the vacuum chamber can be, or can include an insecticide or other active gas. Similarly, the gas can, if desired, include nitrogen or other inert gases, with or without a pesticide or other active gas. Obviously, a pesticides could be applied during other phases of the procedure, for example, as part of the heat-shock or preheat-shock process.

BRIEF DESCRIPTION OF THE DRAWINGS

The invention can better be understood by reference to the drawings in which:

FIG. 2A provides heat balance calculations for water removal by vacuum cooling; and FIG. 2B provides heat balance calculations for water removal by vacuum cooling.

DETAILED DESCRIPTION OF THE PREFERRED EMBODIMENTS

Figure 1:
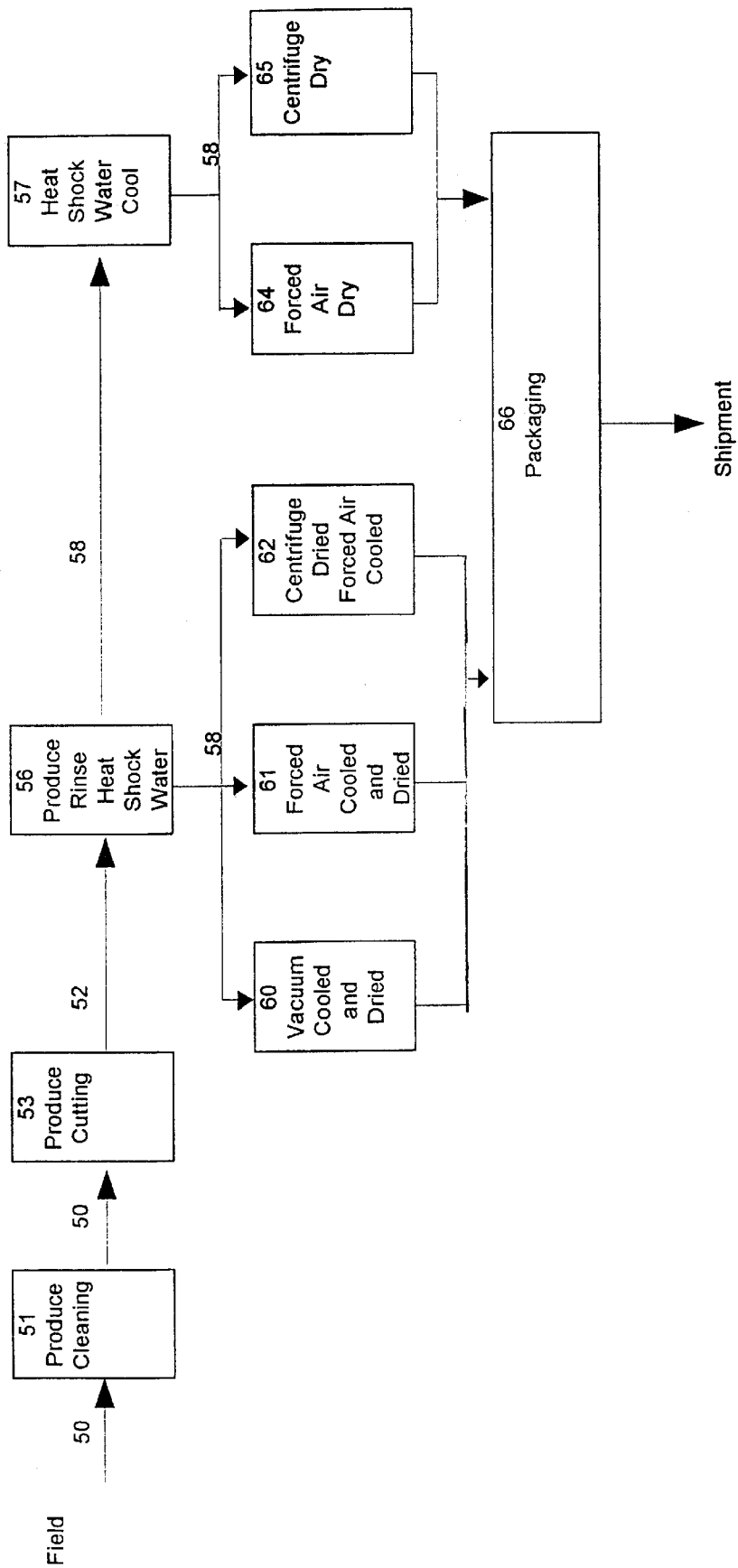
FIG. 1 is a schematic diagram of an embodiment of a process to heat shock, cool and dry produce.

In FIG. 1, harvested lettuce is placed in bins or containers and transported to a processing facility. In area 51, damaged parts of the produce are removed. At station 54, the temperature of the produce is adjusted to a desired level, if necessary, to assure a consistent heat shock response. The produce passes to processing area 53 where the produce is chopped, shredded or subdivided. The produce passes to chamber 56 where it is rinsed with warm water to cause the heat shock reaction. The produce Is then transferred to vacuum cooler/drier 60, or forced air chiller/dryer 61, or centrifuge dryer/forced air cooler 62. Alternatively, the produce can be transferred to cold water bath 57 to attain a desired temperature, then moved to forced air drying 64 or centrifuge drying 65, to remove excess water, leaving the produce with the desired water content and at a desired temperature. The lettuce is then transported to packaging 66.

Alternatively, an anti-browning agent could be added to heat shock water 56 or heat shock quench water 57. Then the lettuce would be transferred to vacuum cooling and drying 60.

In FIG. 1, harvested lettuce is placed in bins or containers and transported to a processing facility. In area 51, damaged parts of the produce are removed. At station 54, the temperature of the produce is adjusted to a desired level, if necessary, to assure a consistent heat shock response. The produce passes to processing area 53 where the produce Is chopped, shredded or subdivided. The produce passes to chamber 56 where it is rinsed with warm water to cause the heat shock reaction. The produce is then transferred to vacuum cooler/drier 60, or forced air chiller/dryer 61, or centrifuge dryer/forced air cooler 62. Alternatively, the produce can be transferred to cold water bath 57 to attain a desired temperature, then moved to forced air drying 64 or centrifuge drying 65, to remove excess water, leaving the produce with the desired water content and at a desired temperature. The lettuce is then transported to packaging 66.

Alternatively, an anti-browning agent could be added to heat shock water 56 or heat shock quench water 57. Then the lettuce would be transferred to vacuum cooling and drying 60.

Figure 3:
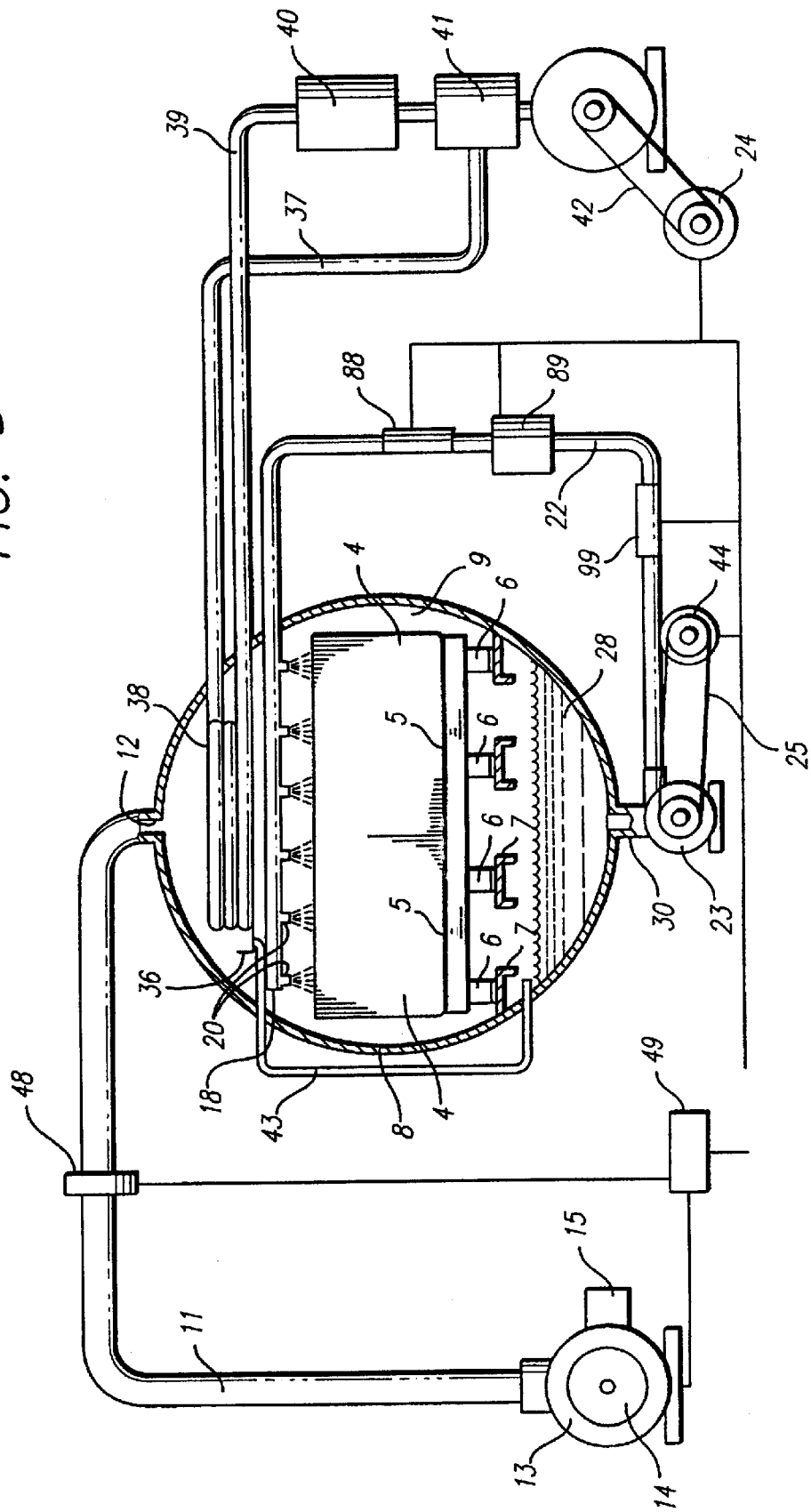
FIG. 3 Is a schematic drawing of an exemplary embodiment of the vacuum chamber of the present invention.

Referring to FIG. 3, produce is placed in containers or cartons 4, stacked on a cart 5, and supported on wheels 6 positioned to run on rails 7 extending from outside to the interior of vacuum tube 8. Usually the produce is packed in ventilated cartons that are stacked on carts 5 at a manageable height.

Vacuum tube 8 forms a vacuum chamber 9 which receives carts 5. Tube 8 is formed of metal of sufficient strength to permit a substantial partial vacuum to be drawn In chamber 9. Usually chamber 8 includes end doors (not shown) that allow carts 5 to be rolled in and out. The end doors then closed for vacuum cooling.

For evacuating chamber 9, duct 11 connects with opening 12 in the upper surface of vacuum tube 8, and extends to vacuum pump 13 that includes outlets 15 for discharging evacuated air into the atmosphere. Motor 14 drive vacuum pump 13. Thus, produce containers 5 can be moved into vacuum tube 8 on carts 5 and a partial vacuum can then be drawn in tube 8 to cause evaporation of moisture from the produce, thereby cooling the produce.

For a further cooling effect, a water manifold 18 is positioned over the produce. Manifold 18 includes a plurality of spray nozzles 20 for spraying water onto the produce and for returning the chamber to atmospheric pressure. A pipe 22 connects with a pump 23. An electric motor 44 connected to pump 23 by belt 25 drives the pump. Inlet duct 30 connects with pump 23 to supply water from a sump 29 in the bottom of vacuum tube 8. Some kinds of produce are adequately cooled by imposing a partial vacuum alone, and without spraying water on the produce. For such produce, condensed water is simply removed from sump 28 and is not recycled to manifold 18.

To minimize the amount of water reaching pump 13, refrigeration coil 38 is positioned above the produce in vacuum tube 8. Coil 38 condenses water vapor from the produce, preventing water from reaching pump 13. Coil 38 also provides additional cooling for produce in tube 8. The coil is supplied with cold refrigerant through an inlet pipe 39 leading from refrigerator mechanism 40. Connected to this mechanism is refrigerator compressor 41. Motor 24 drives compressor 41 by means of drive belt 42. The refrigerant in coil 38 causes water vapor to condense, forming water droplets, which fall by gravity into collector 36. This collected water then flows through drain pipe 43 into sump 28. Collector 36 prevents the condensed water from falling onto the produce thus preventing the bruising and discoloration that would otherwise occur.

Water pump 23 pumps water through pipe 22, through the ozone, peroxide, or ultra-violet light disinfectant chamber 99, manifold 18, and spray nozzles 20, onto the produce. In chamber 99, the water is subjected to ozone, peroxide, and/or UV radiation, alone or in combination, at any Intensity and for a time sufficient to destroy substantial quantities of biological contaminants in the water. Washing produce with the resulting de-contaminated water Increases the marketability of such produce.

Water is cooled by contact with coil 38. This water may be sprayed onto the produce, or may be warmed by passing it through a heat exchanger 89. After warming, the water may be applied in a spray such that the water will fall evenly on the surface of the produce. The reservoir of water in sump 28 provides sufficient humidity to minimize produce dehydration. After reaching the desired subs atmospheric set point, valve 48 in duct 11 between vacuum chamber 9 and vacuum pump 13 is closed, and the pressure is detected by controller 49. If the subatmospheric pressure rises, valve 48 is reopened to continue evaporative cooling. When valve 48 is closed, if the controller 49 detects no increase in pressure, the produce Is cooled to the desired temperature.

After the produce is cooled, valve 88 is opened to allow air to flow from the outside atmosphere through sprinkler supply pipe 22 and sprinkler nozzles 20 into vacuum chamber 9. This action raises the pressure inside chamber 9 to the outside pressure allowing the chamber doors to be opened and the produce on carts 5 to be removed.

While the specification describes particular embodiments of the present Invention, those of ordinary skill can devise variations of the present invention without departing from the inventive concept.

What is claimed is:

1. A cooling system for cooling produce, the cooler comprising:
   a vacuum chamber;
   a support in the chamber for supporting produce;
   a vacuum pump to create a vacuum within the chamber;
   a vacuum release valve subject to the vacuum in the vacuum chamber to release a vacuum in the chamber that may be created by the vacuum pump;
   a pressure controller coupled to the vacuum pump and to the vacuum release valve, the pressure controller configured to control the pressure within the vacuum chamber;
   a water inlet receiving water from a water supply and carrying water into the chamber;
   at least one nozzle for applying water to produce located on the support, the at least one nozzle receiving water from the water inlet and being located within the chamber and above the produce;
   a water pump to supply water through the water inlet to the at least one nozzle; and
   a temperature controller coupled to the water pump to control the temperature of water being applied to produced via the at least one nozzle, such that produce located within the chamber may be cooled in a way that limits evaporation of interstitial water.

2. The cooling system of claim 1, wherein the vacuum release valve is operably between the outside the chamber and the at least one nozzle, the vacuum release valve selectively blocking and permitting outside air to flow from outside the chamber through the at least one nozzle.

3. The cooling system of claim 2, further comprising:
   a refrigeration coil to remove water from the ambient air within the vacuum chamber; and
   a condensate collector positioned to collect condensed water that forms on the refrigeration coil, the collector being position to limit condensed water from falling on any produce located within the vacuum chamber.

4. The cooling system of claim 3, further comprising:
   a reservoir to collect water being sprayed from the at least one nozzle and to collect water collected by the condensate collector;
   the reservoir being in fluid communication with the water pump such that the water pump may supply water from the reservoir to the at least one nozzle.

5. The cooling system of claim 1, further comprising a water source outside the vacuum chamber.

6. The cooling system of claim 1, wherein the temperature controller controls the temperature of the water being sprayed on produce by adding water from an outside water source to water from the reservoir.

7. A method of cooling field-harvested produce, comprising the steps:

placing produce in a vacuum chamber;

discharging a first amount of water onto the produce;

forming a partial vacuum in the vacuum chamber by reducing the internal pressure of the vacuum chamber to a first pressure level that is lower than the atmospheric pressure outside the pressure chamber, the first pressure level being below or near a pressure that causes the discharged water to vaporize;

chilling the air inside the vacuum chamber to a temperature sufficient to cause condensation and collecting the condensate;

limiting condensate dripping on the produce;

adjusting the temperature of the water to be applied to the produce;

discharging a second amount of temperature-adjusted water onto the produce; and adjusting the pressure inside the chamber to a second pressure level that is lower than the atmospheric pressure outside the pressure chamber, the second pressure level being below or near a pressure that causes the discharged water to vaporized.

8. The method of claim 7, wherein the second pressure level is near or about the first pressure level.

9. The method of claim 7, wherein the second pressure level is less than the first pressure level.

10. The method of claim 7, wherein the step of discharging a first amount of water occurs during the step of forming a partial vacuum.

11. The method of claim 7, wherein the step of discharging a second amount of water occurs during the step of adjusting the pressure inside the chamber to a second pressure level.

12. The method of claim 7, further comprising permitting outside air to enter the chamber in a controlled fashion so as to limit the removal of interstitial water from the produce.

13. The method of claim 7, wherein the step of adjusting the temperature of the water comprises adjusting the temperature of the water to be applied to the produce by passing the water through a heat exchanger to warm the water.

14. The method of claim 7, wherein the step of adjusting the temperature of the water comprises adjusting the temperature of the water to be applied to the produce by passing the water through a heat exchanger to warm the water, the heat exchanger utilizing warm water from an outside source to warm the water passing through the heat exchanger.

15. The method of claim 7, wherein the step of adjusting the temperature of the water comprises obtaining water from a water supply whose temperature is greater than a temperature of the chilled condensate that has been collected.

* * * * *